US00RE49186E

(19) United States
(12) Reissued Patent
Fleischman

(10) Patent Number: US RE49,186 E
(45) Date of Reissued Patent: Aug. 23, 2022

(54) SYSTEMS AND METHODS FOR PROTECTING AN ONLINE SERVICE AGAINST A NETWORK-BASED ATTACK

(71) Applicant: DocuSign, Inc., San Francisco, CA (US)

(72) Inventor: Eric Fleischman, Redmond, WA (US)

(73) Assignee: DocuSign, Inc., San Francisco, CA (US)

(21) Appl. No.: 16/864,067

(22) Filed: Apr. 30, 2020

Related U.S. Patent Documents

Reissue of:

(64) Patent No.: 10,003,611
Issued: Jun. 19, 2018
Appl. No.: 14/971,418
Filed: Dec. 16, 2015

U.S. Applications:

(63) Continuation of application No. 14/575,801, filed on Dec. 18, 2014, now Pat. No. 9,253,206.

(51) Int. Cl.
*H04L 9/40* (2022.01)

(52) U.S. Cl.
CPC ..... *H04L 63/1458* (2013.01); *H04L 63/0227* (2013.01); *H04L 63/1416* (2013.01)

(58) Field of Classification Search
CPC ..... H04L 63/0227; H04L 63/1416; H04L 63/1458
See application file for complete search history.

(56) References Cited

U.S. PATENT DOCUMENTS 7,925,766 B2 * 4/2011 Jayawardena ..... H04L 45/00 370/401
8,010,085 B2 * 8/2011 Apte ..... G06F 21/577 370/338
8,286,244 B2 * 10/2012 Namburu ..... H04L 63/1458 709/223

(Continued)

FOREIGN PATENT DOCUMENTS

WO WO-2006004556 A1 1/2006
WO WO-2016099584 A1 6/2016

OTHER PUBLICATIONS

"U.S. Appl. No. 14/575,801, Non Final Office Action dated Apr. 16, 2015", 16 pgs.

(Continued)

*Primary Examiner* — Jalatee Worjloh
*Assistant Examiner* — Karin Reichle
(74) *Attorney, Agent, or Firm* — Fenwick & West LLP

(57) ABSTRACT

Techniques for protecting an online service against network-based attacks are described. In some cases, protection is performed by way of a scalable protection service including a dynamically scalable set of virtual machines hosted by a cloud service that is distinct from a data center that hosts the online service. The protection service is coupled to the online service via a private link. When an attack is detected by the online service, network traffic bound for the online service is redirected from the public network to the protection service. The protection service then processes the network traffic, such as by dropping network traffic associated with the attack and forwarding legitimate network traffic to the online service via the private link.

19 Claims, 9 Drawing Sheets

(56) References Cited

U.S. PATENT DOCUMENTS

| | | | | |
|---|---|---|---|---|
| 8,613,089 | B1 * | 12/2013 | Holloway | H04L 63/1416 726/23 |
| 8,881,223 | B2 * | 11/2014 | Hudis | G06F 17/30867 709/225 |
| 8,892,766 | B1 * | 11/2014 | Wei | H04L 63/1408 706/22 |
| 9,253,206 | B1 | 2/2016 | Fleischman | |
| 2004/0170123 | A1 | 9/2004 | Carpenter et al. | |
| 2007/0011740 | A1 | 1/2007 | Davis et al. | |
| 2007/0097976 | A1 * | 5/2007 | Wood | H04L 63/1416 370/392 |
| 2007/0157306 | A1 | 7/2007 | Elrod et al. | |
| 2008/0178279 | A1 * | 7/2008 | Namburu | H04L 63/1458 726/13 |
| 2008/0270601 | A1 | 10/2008 | Ishikawa | |
| 2009/0178132 | A1 * | 7/2009 | Hudis | G06F 17/30867 726/12 |
| 2010/0251329 | A1 | 9/2010 | Wei | |
| 2010/0257605 | A1 | 10/2010 | McLaughlin et al. | |
| 2012/0005724 | A1 | 1/2012 | Lee | |
| 2012/0124666 | A1 | 5/2012 | Kim et al. | |
| 2012/0324572 | A1 | 12/2012 | Gordon et al. | |
| 2013/0055374 | A1 | 2/2013 | Kustarz et al. | |
| 2013/0103834 | A1 | 4/2013 | Dzerve et al. | |
| 2013/0139246 | A1 * | 5/2013 | Tryc | H04L 63/0245 726/13 |
| 2013/0185795 | A1 | 7/2013 | Winn et al. | |
| 2013/0263256 | A1 | 10/2013 | Dickinson et al. | |
| 2013/0291100 | A1 | 10/2013 | Ganapathy et al. | |
| 2014/0250491 | A1 | 9/2014 | Fleischman et al. | |
| 2014/0365350 | A1 | 12/2014 | Shvarts | |
| 2015/0026757 | A1 | 1/2015 | Reddy et al. | |
| 2016/0036837 | A1 * | 2/2016 | Jain | H04L 63/1458 726/23 |
| 2016/0036857 | A1 * | 2/2016 | Foxhoven | G06F 12/0815 726/1 |

OTHER PUBLICATIONS

"U.S. Appl. No. 14/575,801, Notice of Allowance dated Oct. 2, 2015", 18 pgs.

"U.S. Appl. No. 14/575,801, Response filed Jul. 16, 2015 to Non Final Office Action dated Apr. 16, 2015", 13 pgs.

"International Application Serial No. PCT/US2015/013330, International Search Report dated Oct. 15, 2015", 2 pgs.

"International Application Serial No. PCT/US2015/013330, Written Opinion dated Oct. 15, 2015", 5 pgs.

"U.S. Appl. No. 14/575,801, Corrected Notice of Allowance dated Jan. 6, 2016", 2 pgs.

"International Application Serial No. PCT/US2015/013330, International Preliminary Report on Patentability dated Jun. 29, 2017", 7 pgs.

* cited by examiner

SYSTEMS AND METHODS FOR PROTECTING AN ONLINE SERVICE AGAINST A NETWORK-BASED ATTACK

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

PRIORITY

This application *is a reissue of U.S. Pat. No. 10,003,611, which was filed as application Ser. No. 14/971,418 on Dec. 16, 2015, which* is a Continuation of U.S. patent application Ser. No. 14/575,801, filed Dec. 18, 2014, *now U.S. Pat. No. 9,253,206,* which [application is] *applications are* incorporated herein by reference in [its] *their* entirety.

FIELD OF THE INVENTION

The present disclosure relates to systems and methods for protecting an online service against a network-based attack, such as a denial of service attack.

BACKGROUND

Denial of Service ("DoS)" attacks present a significant challenge to online services. As a service increases in prominence in the marketplace, so too does the attraction of taking the service down by way of a denial of service attack. For small and medium-scale services, a denial of service attack can cripple a service for hours or even days, resulting in considerable damage to the reputation and/or finances of the service. For large-scale services, the threat of denial of service attacks becomes a tax on operations, as the services significantly over-resource their networks and other infrastructure to absorb denial of service attacks. Small and medium-scale services simply cannot afford to employ this approach.

Denial of service attacks include volumetric attacks against online services. A volumetric denial of service attack attempts to overwhelm a service with a large volume of unsolicited "random" traffic. This traffic is readily identifiable and thus can be filtered. However, in such an attack, the volume of traffic is so large that network infrastructure and filtering devices such as firewalls become overwhelmed. Typical modem volumetric attacks require a service be able to ingest 100-300 Gbps of traffic, a level that is out of reach for all but the largest services.

Another type of denial of service attack is an application-level attack. In an application-level attack, the attacking party attempts to consume disproportionately large shares of computational resources of the target service in an effort to deny or reduce the availability of the service to legitimate users. Examples of application-level attacks include partial TCP or HTTP handshakes, computational attacks against Secure Sockets Layer, disk consumption attacks, and the like.

Most approaches to protecting a service against a denial of service attack rely on deploying sufficient infrastructure to deploy defenses against the attack. However, given that hundreds of gigabits per second of network bandwidth (and corresponding filtering devices) are required to handle modem denial of service attacks, purchasing sufficient infrastructure is cost prohibitive for organizations that operate small and medium-scale services.

As a result of the high cost of obtaining access to sufficient network infrastructure to protect against a denial of service attack, many organizations rely on third-party protection services. In such an arrangement, under normal operation, network traffic is routed from a public network (e.g., the Internet) to servers that provide the online service. Then, when an attack is detected, network traffic is manually re-routed from the Internet to the third-party protection service. The third-party protection service manages or has access to sufficient network infrastructure to process the network traffic associated with the attack. Processing the traffic typically includes filtering traffic associated with the attack and possibly routing legitimate traffic back to the online service via the Internet.

While protection based on a third-party protection service is effective against a range of denial of service attacks, such an approach does suffer from a number of drawbacks. First, this approach is fundamentally reactive. Traffic can only be routed through the infrastructure of the third-party protection service after an attack is detected. The overall response time, measured from attack detection to normalization, is measured in tens of minutes or even hours. This means that the online service will still be unavailable for a substantial length of time before the attack is adequately addressed by the third-party protection service. Depending on the type of service, such an outage can still cause substantial damage to the reputation and finances of the service.

Nor do third-party protection services protect against many if not most application-level attacks. While third-party protection services can adequately address volumetric attacks, online services are still left vulnerable to many types of application attacks. Because application attacks may be specific to the type and/or function of the online service, the generic protections provided by third-party protection services do not cover the specific application-level protection needs of the online service. This requires the online service to over-provision their computational resources to handle such attacks, which largely defeats the purpose of engaging the third-party protection service in the first place.

Third-party protection services also do not fully address all volumetric attacks. This problem relates to the fact that the third-party protection service routes network traffic back to the online service via a "secret" Internet circuit. If this back channel is detected and attacked directly, the attacker can bypass the infrastructure protections provided by the third-party protection service.

BRIEF DESCRIPTION OF THE DRAWINGS

Preferred and alternative examples of the present invention are described in detail below with reference to the following drawings.

DETAILED DESCRIPTION

Embodiments described herein provide enhanced computer- and network-based systems and methods for protecting an online service against network-based attacks. Example embodiments are configured to protect on online service that is provided by one or more computing systems that are hosted in a data center that is coupled to a public network such as the Internet. Protection is performed by way of a scalable protection service comprising a dynamically scalable set of virtual machines hosted by a cloud service that is distinct from the data center that hosts the computing systems of the online service. The protection service is coupled to the online service via a private link. When an attack is detected by the online service, network traffic bound for the online service is redirected from the public network to the protection service. The protection service then processes the network traffic, such as by dropping network traffic associated with the attack and forwarding legitimate network traffic to the online service via the private link.

The described techniques are applicable in a wide variety of contexts. Below, the techniques are described as being deployed with respect to an example online service that is a digital transaction service that provides an electronic signature service which facilitates the collection of electronic signatures with respect to documents such as agreements, contracts, purchase orders, and the like. Using the described techniques in conjunction with a digital transaction service is but one possible deployment scenario, and should not be interpreted as limiting. The described techniques can generally be used in conjunction with any digital transaction services, including electronic signature services, real estate transaction services, online purchasing systems, payroll systems, procurement systems, human resources systems (e.g., time tracking, billing systems), and the like. Furthermore, the described techniques can be used to protect other types of online services, such as messaging services (e.g., online email systems), social networking services, content providers, and the like.

System Overview

Figure 1:
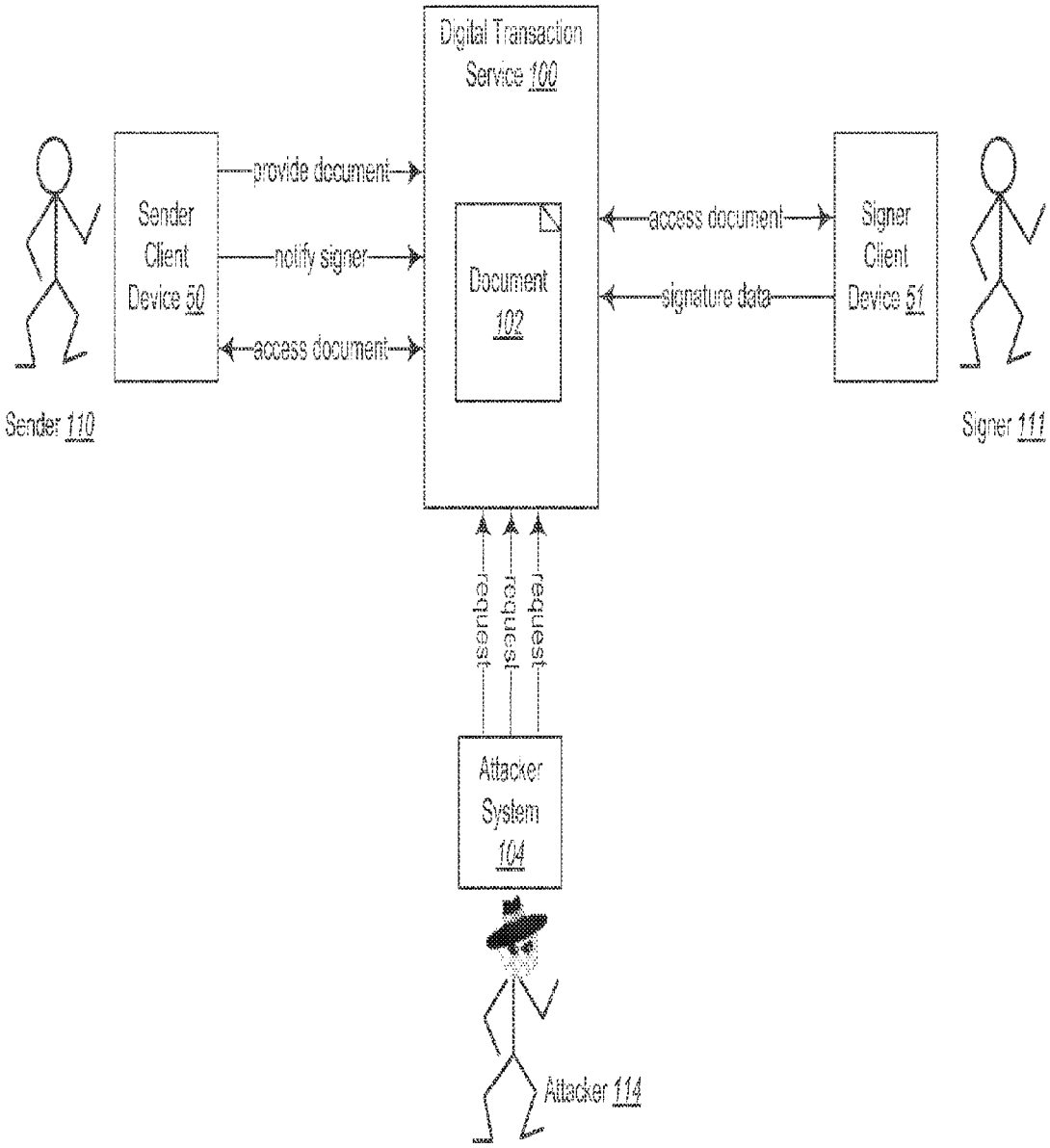
FIG. 1 is a block diagram that illustrates an example attack on an example embodiment of an online service.

FIG. 1 is a block diagram that illustrates an example attack on an example embodiment of an online service. In particular, FIG. 1 depicts an attack on a Digital Transaction Service (DTS) 100 that provides an electronic signature capability. The DTS 100 is an example of an online service that can be protected by the described protection service.

The DTS 100 is utilized by a sender user 110 and a signer user 111 to facilitate an electronic signing of a signature document. In the illustrated scenario, the sender 110 operates a sender client device 50 in order to provide (e.g., upload, transmit) an electronic document 102 (e.g., an invoice, contract, purchase order, agreement) to the DTS 100, where it is securely stored. The DTS 100 then notifies the signer 111 that the document 102 is ready for signature, such as by sending an email containing a link that can be used to access the document 102. The signer 111 operates client device 51 in order to access, review, and sign the document. Once the signer 111 has signed the document 102, the DTS 100 stores an indication of the signature in association with the document 102. The DTS 100 may then notify the sender 110 that the document has been signed, such as by transmitting an email containing a link that can be used to access the document 102.

In the illustrated scenario, the DTS 100 is being attacked by an attacker system 104, operated by an attacker 114. In this simplified example, the attacker 114 is using the system 104 to attempt to overwhelm the DTS 100 with requests. The large number of requests issued by the attacker system 104 can impact the DTS 100 in various ways. For example, the attacker requests may form a volumetric attack, by flooding the network infrastructure (e.g., communication links, routers, firewalls, interface devices) that connects the DTS 100 to a public network that is also used by legitimate parties, such as the sender 110 and signer 111. By overwhelming the network infrastructure used by the DTS 100, the sender and signer may no longer be able to access the document 102 or perform other functions provided by the DTS 100.

The attacker requests may also or instead constitute an application-level level attack against the DTS 100. In such an attack, the attack requests may appear to be legitimate requests (e.g., to access a document, to establish a secure connection) and typically do not saturate the network infrastructure of the DTS 100. Instead, the attack requests overwhelm the computing resources (e.g., CPU, memory, disk) of the DTS 100, such as by causing the DTS 100 to perform excessive computations, allocate an excess number of in-memory data structures, or the like. For example, the attack requests may be requests to establish a secure connection. Since establishing a secure connection requires the DTS 100 to perform computationally expensive encryption and decryption operations, a large number of such requests may overburden the processing units (e.g., CPUs) of the DTS 100.

Figure 2A:
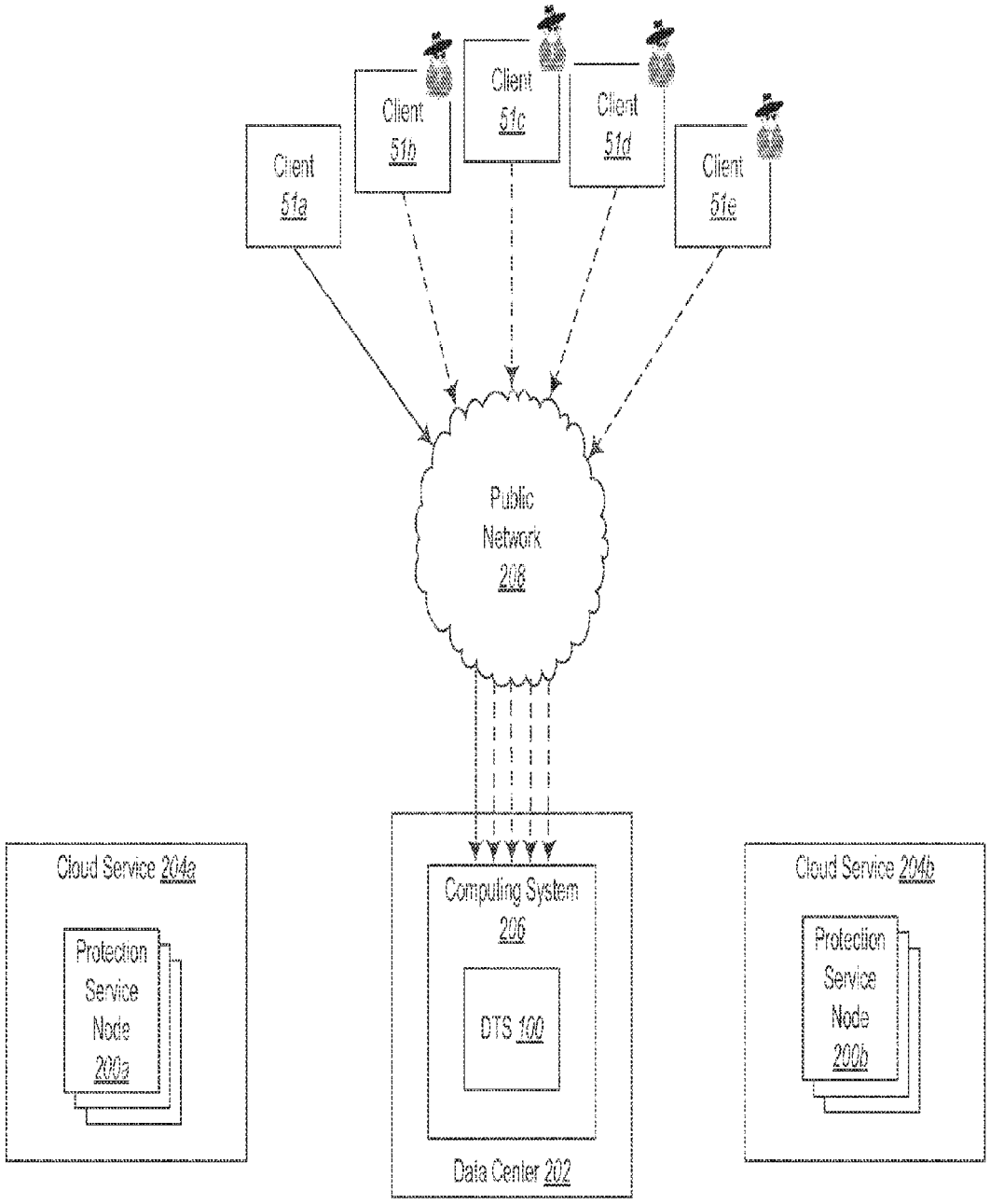
FIGS. 2A and 2B are block diagrams that illustrate protecting an online service against a network-based attack according to an example embodiment.
Figure 2B:
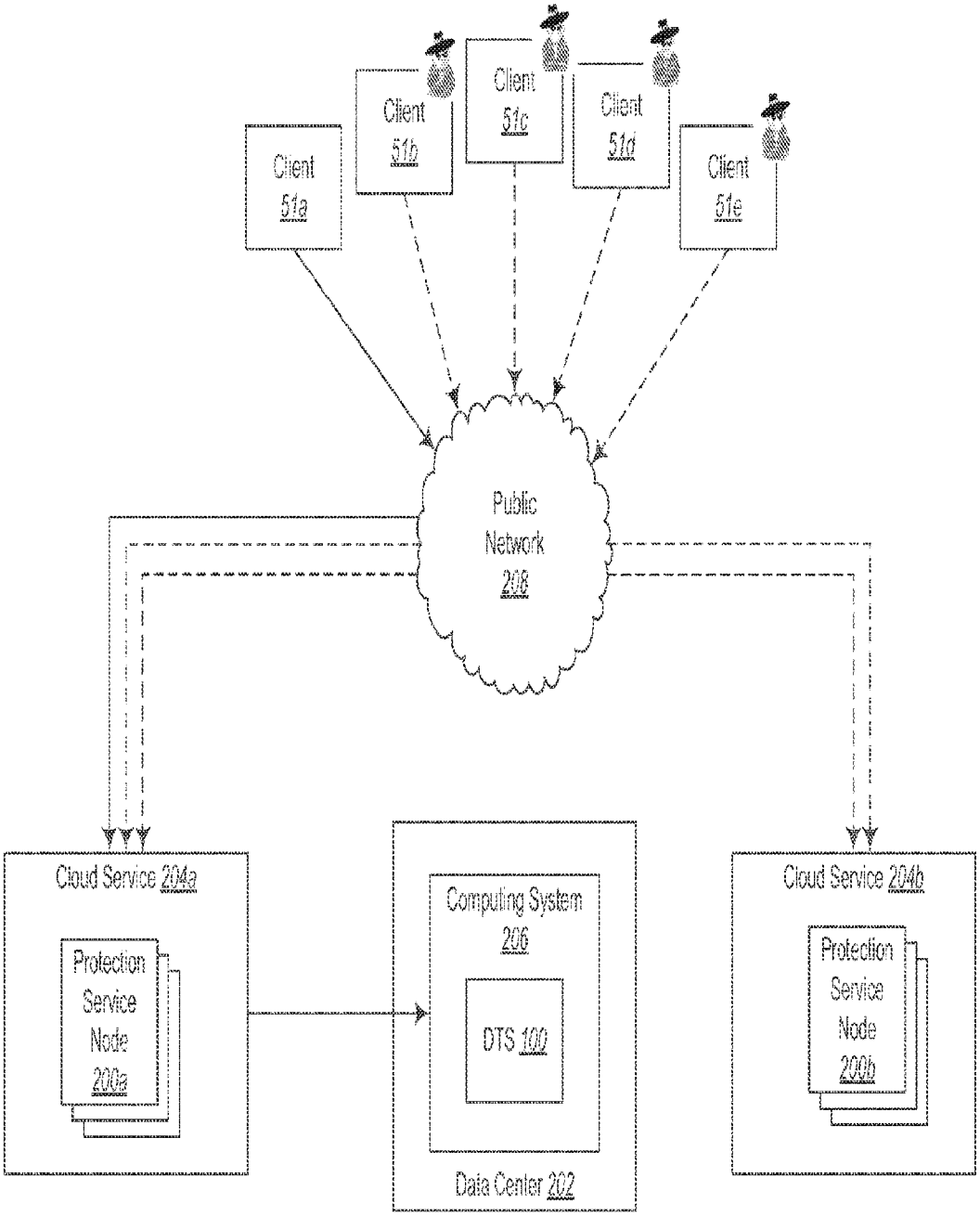

FIGS. 2A and 2B are block diagrams that illustrate protecting an online service against a network-based attack according to an example embodiment.

FIG. 2A depicts an initial phase of a network-based attack. In FIG. 2A, the DTS 100 executes on a computing system 206 that is resident within a data center 202. Multiple clients 51a-51e are transmitting requests via a public network 208 to the computing system 206. Client 51a is operated by a legitimate user. The requests made by client 51a are shown as solid lines. Clients 51b-51e are operated by malicious users that attack the DTS 100 by way of requests shown as dashed lines.

In the illustrated scenario, the attack by malicious clients 51b-51e functions to impair (e.g., overwhelm, deny, corrupt, disable, degrade) the operation of the DTS 100. The attack may impair the operation of the DTS 100 in various ways, such as by saturating the network infrastructure (e.g., routers, network interfaces, communication channels) used by the computing system 206 to communicate with the public network 208, saturating computing resources (e.g., processors, memory, disk) of the computing system 206, or the like.

In other cases, the attack may be configured to exploit a vulnerability present in the computing system 206 and/or the DTS 100. For example, the requests from malicious clients 51b-51e may be configured to access private data stored by the DTS 100, inject code for execution by the computing system 206, or the like.

Also shown in FIG. 2A are cloud services 204a and 204b, which are respectively executing protection service nodes 200a and 200b. The illustrated protection service nodes 200a and 200b function to protect the DTS 100 from the attack, as described with respect to FIG. 2B, below. The cloud services 204 are distinct from the data center 202. That is, the cloud services 204 are both physically and organizationally distinct from the data center 202 in that they are located at distinct physical locations and operated by different entities.

The cloud services 204 each provide a shared pool of computing resources that are available in an on-demand fashion. In typical implementations, each cloud service 204 comprises one or more data centers that are connected to the public network 208 via high-bandwidth network connections. Each data center of the cloud services 204 hosts a large quantity of physical computing systems (e.g., servers) that made available for use by clients (e.g., the computing system 206) of the cloud service 204 in a dynamic fashion. Typically, each cloud service 204 provides an interface (e.g., API) that can be used by clients to dynamically create, provision, and otherwise manage virtual machines executing on the physical computing systems of the cloud service 204. The network and computing resources provided by the cloud services 204 are sometimes referred to as "elastic," meaning that those resources can be rapidly and dynamically allocated, provisioned, and released. This property facilitates the implementation of services and systems executing within the cloud services 204 that rapidly scale in response to demand.

FIG. 2B depicts a response to the network-based attack shown in FIG. 2A. When the DTS 100 (or some associated module) detects the attack, all network traffic is redirected to one or both of the cloud services 204. In this example, the network traffic bound for the DTS 100 via the public network 208 is distributed across the cloud services 204, so that legitimate requests from client 51a (solid lines) and malicious requests from clients 51b and 51c (dashed lines) are redirected to the cloud service 204a, while malicious requests from clients 51d and 51e (dashed lines) are directed to the cloud service 204b.

The protection service nodes 200a and 200b hosted by the cloud services 204 process the received network traffic. For example, the nodes 200 may process the network traffic by filtering out (e.g., dropping) network traffic that is associated with the attack, while forwarding to the DTS 100 network traffic associated with legitimate requests, such as those received from client 51a.

Legitimate network traffic is forwarded to the DTS 100 by way of a private link connecting the cloud service to the data center 202. The private link may be provided or established by way of a dedicated line or circuit that carries no network traffic for third parties. The private link may be undiscoverable or un-traversable by outside parties. For example, the private link may use private network addresses that are un-routable with respect to the public network 208. Thus, even if an attacker learns the network addresses used by the protection service nodes 200 to communicate with the DTS 100, the attacker cannot address packets to the DTS 100 from one of the clients 51.

In some embodiments, each protection service node 200 is a virtual machine executing on physical hardware hosted by the cloud service 204. The number of protection service nodes 200 is elastic with respect to the volume of network traffic received and/or computational resources required to handle the received network traffic. In other words, as the volume of network traffic increases, additional nodes 200 can be brought online to handle the increased load. During periods of ordinary operation, when no attack is present, at most a small number of protection service nodes are present. This number can be rapidly scaled up in response to a detected attack. The described techniques are thus capable of protecting the DTS 100 from a network attack so long as the physical network and computing capacity of the cloud service 200 is sufficient to host a number of network nodes 200 that meets or exceeds the resources required to process the attack. Since providing a sufficient amount of network bandwidth for is multitude of customers is a core requirement for typical cloud services, the cloud service will provide network bandwidth in excess of the amount that could be mustered by even the most sophisticated, large-scale attack.

In addition, because the described techniques scale dynamically with the size of the attack, economic efficiencies are obtained, particularly given the billing models employed by most cloud services. Typical cloud services employ a use-based fee model, where fees are based on how many virtual machines are used and on how long those virtual machines are in use. Inbound network bandwidth is also typically free. During ordinary operation, the DTS 100 is not under attack, meaning that no (or only a very small number) network nodes 200 need to be allocated, resulting in minimal cloud services costs to the operator of the DTS 100. Furthermore, the operator of the DTS 100 pays nothing for the inbound network bandwidth required during the attack. In short, the operator of the DTS 100 only pays for the protection service when it is actually needed.

Figure 3:
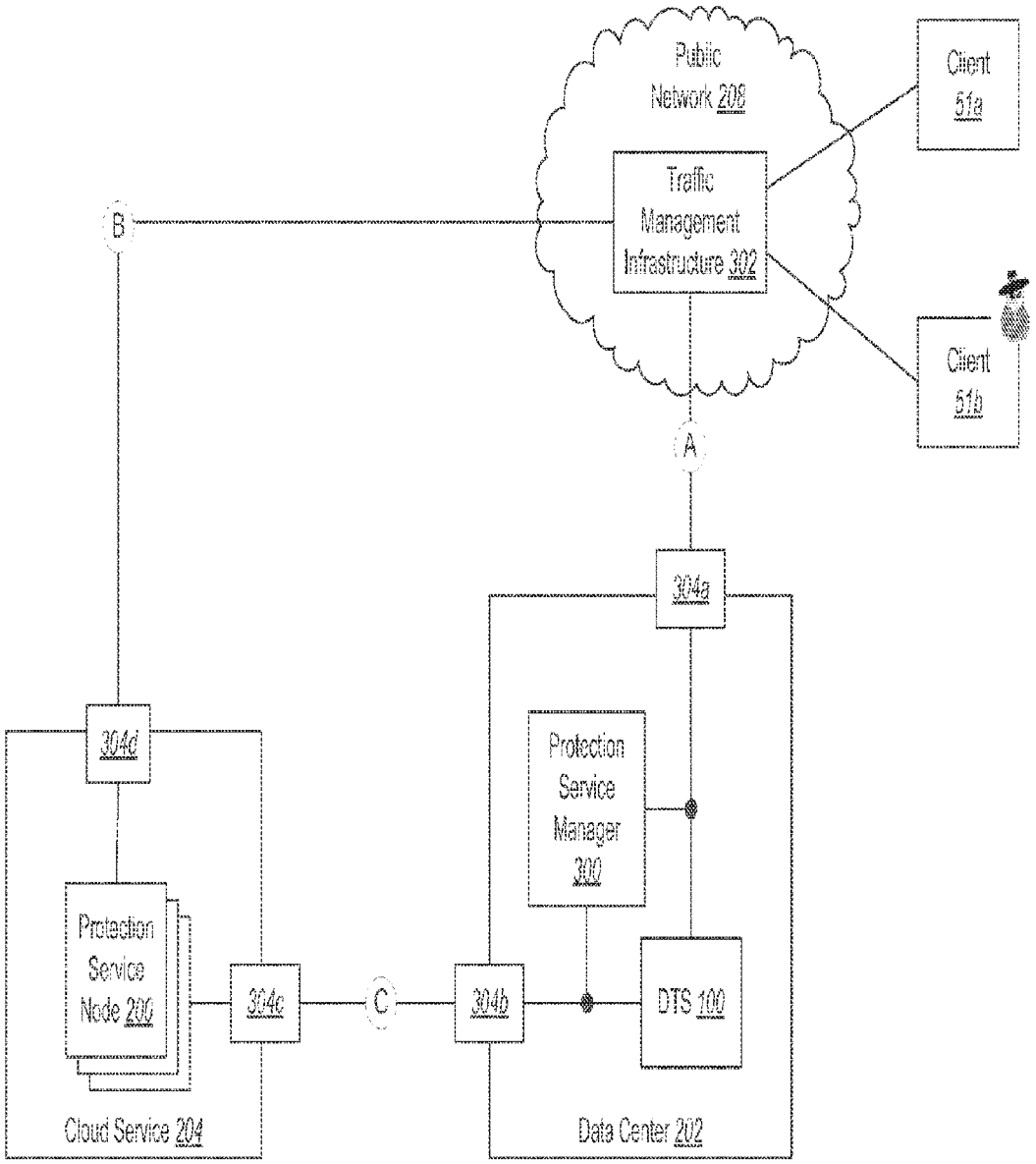
FIG. 3 is a block diagram that illustrates operation of a protection service manager according to an example embodiment.

FIG. 3 is a block diagram that illustrates operation of a protection service manager according to an example embodiment. FIG. 3 illustrates a data center 202, a cloud service 204, and a public network 208, as described above.

The data center 202 and cloud service 204 also include network interface devices 304a-304d. The network interface devices 304a-304d may include routers, firewalls, gateways, or the like. The network interface devices 304a-304d are used to establish and manage communication links to other networks or systems. For example, the network interface device 304a is used to form a link A between the data center 202 and the public network 208; the network interface device 304d is used to form a link B between the cloud service 204 and the public network 208; and the network interface devices 304b and 304c are used to form a private link C between the data center 202 and the cloud service 204.

The public network 208 also includes traffic management infrastructure 302. Traffic management infrastructure 302 includes devices (e.g., routers) and systems (e.g., domain name servers) that manage the flow of network traffic throughout the public network 208.

The data center 202 also includes a protection service manager 300. The protection service manager 300 is responsible for detecting and orchestrating a response to an attack against the DTS 100. The logic of the manager 300 may be incorporated into the DTS 100 or instead operate as a stand-alone module, as shown.

The manager 300 monitors the network traffic flowing to the DTS 100 from the public network 208 over link A. When the manager 300 detects an attack, the manager 300 instructs the traffic management infrastructure 302 to redirect network traffic bound for the DTS 100 via link A to instead travel to the protection service nodes 200 via link B. This operation may be performed by adjusting routing information used by routers and gateway devices located in the public network 208, such as via use of the Border Gateway Protocol. Alternatively, or in addition, the domain name servers in the public network 208 may be instructed to remap the domain name of the DTS 100 to addresses associated with the protection service nodes 200.

Redirected network traffic is processed by the protection service nodes 200. In some embodiments, at least some of the work processing redirected network traffic is also or instead performed by infrastructure provided by the cloud service 204, such as the interface device 304d. For example, the interface device 304d may be or include a firewall that is or can be configured (e.g., by the manager 300, the nodes 200, network management systems of the cloud service 204) to automatically filter out certain classes or types of network packets. In such an embodiment, the protection service nodes 200 operate as a proxy that redirects those network packets that did not get filtered by the interface device 304d to private link C for transmission to the DTS 100. In other embodiments, such filtering (or additional filtering) is performed by the protection service nodes 200 themselves.

The protection service nodes 200 may perform other or additional functions. For example, the protection service nodes 200 may perform content-based filtering of network packets or requests, in order to identify and filter malicious payloads. As another example, the protection service nodes 200 may perform rate limiting, such as by limiting the flow of packets received from a specified source address or address range. Such a technique may of course be employed in order to limit malicious packets, but may also be used to enforce a quota mechanism upon legitimate users of the DTS 100.

In some embodiments, the protection service nodes 200 may be employed to perform one or more functions of the DTS 100. For example, the protection service nodes 200 may be configured to serve static content, in order to reduce the load on the DTS 100 and/or improve response times to client systems or devices.

Example Processes

Figure 4A:
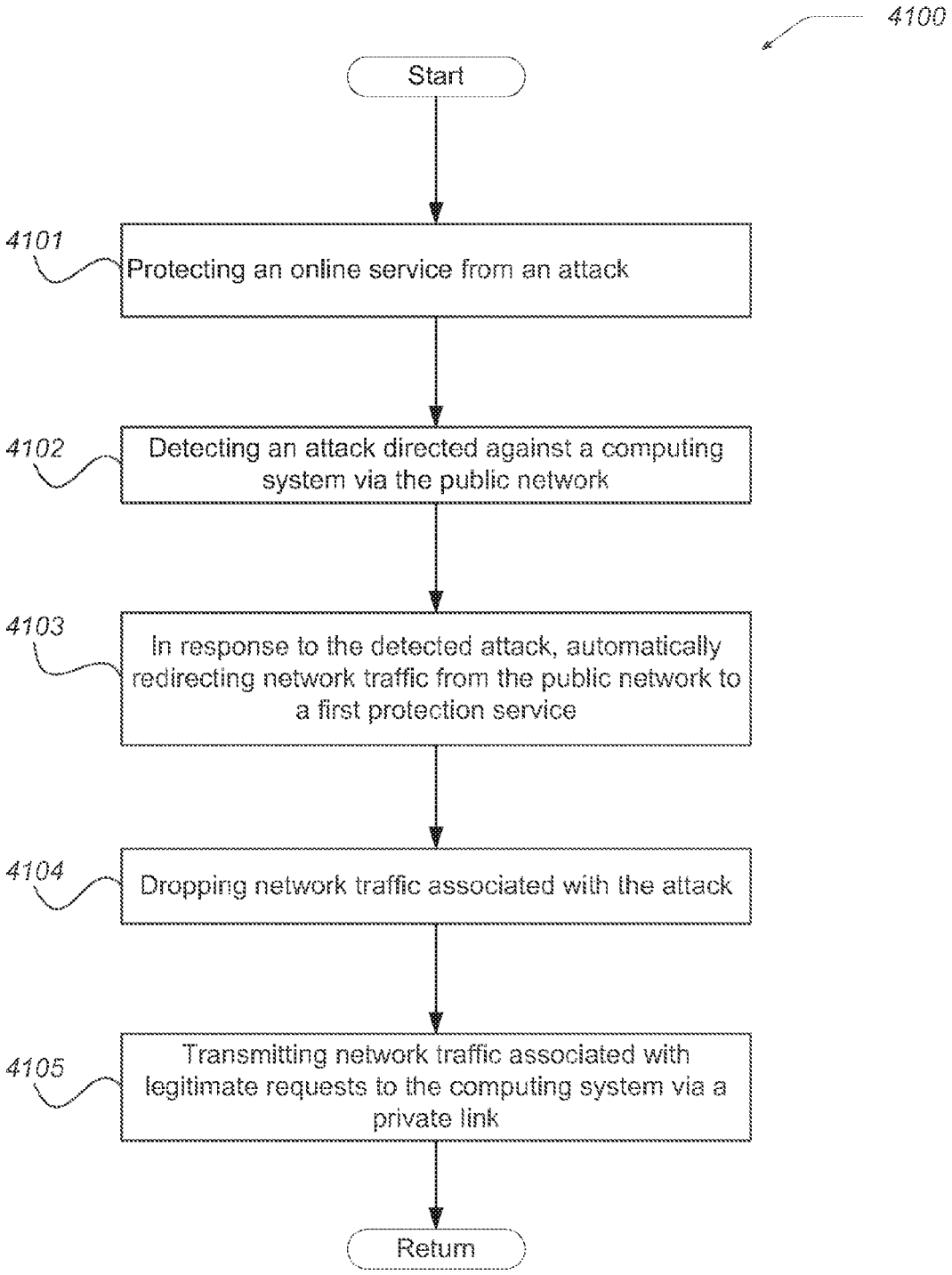
FIGS. 4A-4E are flow diagrams of protection processes performed by example embodiments.

FIG. 4A is a flow diagram of example logic for protecting an online service. The illustrated logic in this and the following flow diagrams may be performed by, for example, the protection service manager 300 and/or protection service nodes 200 described above. More particularly, FIG. 4A illustrates a process 4100 that includes operations performed by or at the following block(s).

At block 4101, the process performs protecting the online service from an attack, the online service provided by a computing system hosted in a data center and a first protection service hosted by a first cloud service that is distinct from the data center, wherein the computing system is communicatively coupled to a public network and communicatively coupled to the first protection service via a first private link, by: performing operation(s) of block(s) 4102, 4103, 4104 and 4105, described below.

At block 4102, the process performs detecting an attack directed against the computing system via the public network. Detecting the attack may include monitoring the volume of network traffic inbound from the public network to the data center. The attack may be detected when the volume of traffic exceeds a specified or determined threshold. Such a threshold may be determined manually or automatically, such as based on a historical average of network traffic volume. In other embodiments, the type of network traffic may be monitored, to identify network data (e.g., messages, packets, requests) that have that are associated with malicious traffic, such as based on source address, packet data, or the like.

At block 4103, the process performs in response to the detected attack, automatically redirecting network traffic from the public network to the first protection service, the redirected network traffic including network traffic associated with the attack and network traffic associated with legitimate requests to the computing system. Redirecting network traffic can be accomplished in a variety of ways. In one embodiment, the process automatically adjusts routing information in the public network to cause network packets bound for the online service to flow to the first protection service instead. Adjusting routing information may include using the Border Gateway Protocol to configure routers and other devices to direct the flow of packets over the public network. In other cases, the Domain Name System may be utilized to redirect traffic by remapping domain names to different addresses. Other approaches for redirecting traffic are contemplated.

At block 4104, the process performs dropping network traffic associated with the attack. Dropping network traffic associated with the attack may include first identifying network packets, requests, messages, or the like that are associated with the attack. Such traffic may be identified by address, header fields, message contents, or the like. Once the process identifies packets or other structures associated with the attack, those packets are dropped. Dropping network traffic associated with the attack is typically performed by the first protection service. However, in some embodiments, packets may also or instead by dropped by a networking device (e.g., a firewall or router) located in the first cloud service that is instructed by the process to drop malicious network traffic.

At block 4105, the process performs at the first protection service, transmitting the network traffic associated with the legitimate requests to the computing system via the private link. As illustrated in FIG. 3, network traffic associated with legitimate requests is forwarded via the private link to the computing system that hosts the online service.

Figure 4B:
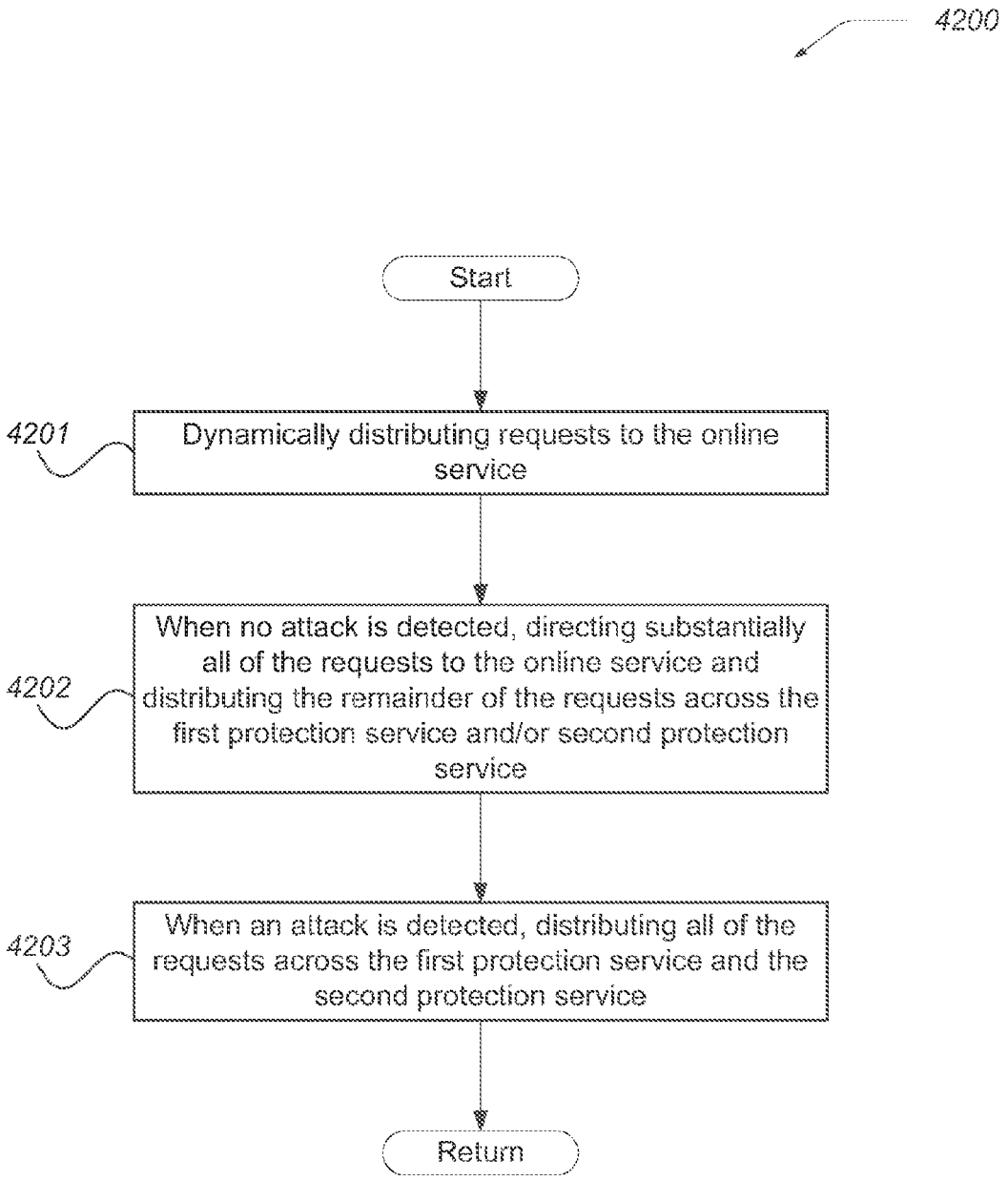

FIG. 4B is a flow diagram of example logic illustrating an embodiment of process 4100 of FIG. 4A. More particularly, FIG. 4B illustrates a process 4200 that includes the process 4100, wherein the online service further includes a second protection service hosted by a second cloud service that is distinct from the data center and the first cloud service, the second protection service communicatively coupled to the computing system via a second private link, and further comprising operations performed by or at one or more of the following block(s).

At block 4201, the process performs dynamically distributing requests to the online service by: performing operation(s) of block(s) 4202 and 4203, described below. Some embodiments employ multiple cloud services provided by different operators. Such an approach provides redundancy and additional scalability.

At block 4202, the process performs when no attack is detected, directing substantially all of the requests to the online service and distributing the remainder of the requests across the first protection service and/or second protection service. During ordinary operating conditions, the process may distribute a small fraction of the requests to the protection service. By distributing some requests to the protection service, the process can exercise the protection service in order to assure that it is still functioning.

At block 4203, the process performs when an attack is detected, distributing all of the requests across the first protection service and the second protection service, so that. During an attack, requests may be distributed equally across multiple protection services. Alternatively, requests may be distributed across multiple protection services as a function of the network and computing resources available at each cloud service, so that those protection services operating in cloud services having more resources will obtain more requests.

Figure 4C:
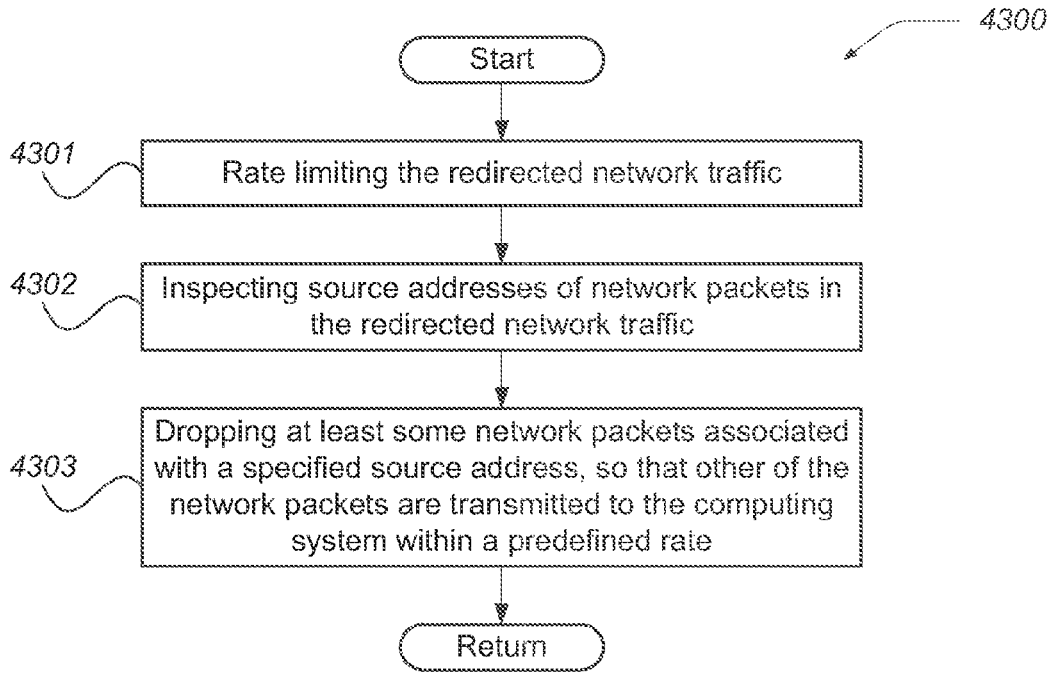

FIG. 4C is a flow diagram of example logic illustrating an embodiment of process 4100 of FIG. 4A. More particularly, FIG. 4C illustrates a process 4300 that includes the process 4100, and which further includes operations performed by or at the following block(s).

At block 4301, the process performs rate limiting the redirected network traffic by performing operation(s) of block(s) 4302 and 4303, described below. The protection service may perform services beyond filtering and redirection of traffic. For example, the service may rate limit the flow of network packets in certain situations or for certain types of communication. In this example, the process rate limits communication from a specified source address. Note that this technique may be employed to manage traffic flow that may be legitimate, but exceeds the capacity of the online service, established service levels or quotas, or the like.

At block 4302, the process performs inspecting source addresses of network packets in the redirected network traffic.

At block 4303, the process performs dropping at least some network packets associated with a specified source address, so that other of the network packets are transmitted to the computing system within a predefined rate. Source addresses for rate limits may be user-specified or determined automatically, such as based on metrics gathered by the online service indicating that particular source addresses associated with large volumes of network traffic.

Figure 4D:
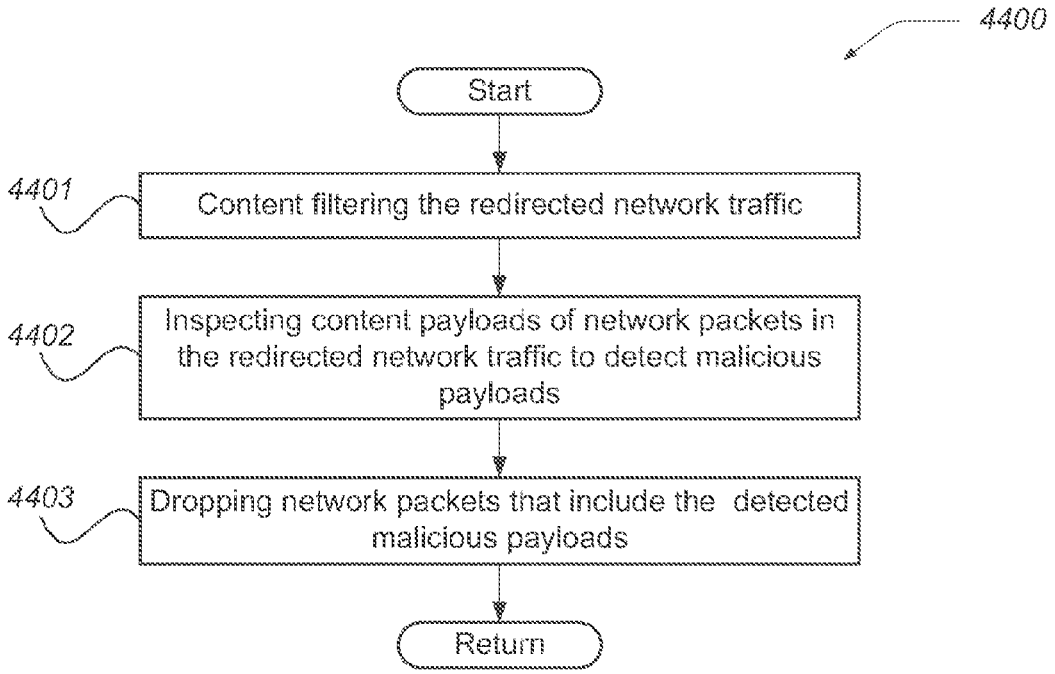

FIG. 4D is a flow diagram of example logic illustrating an embodiment of process 4100 of FIG. 4A. More particularly, FIG. 4D illustrates a process 4400 that includes the process 4100, and which further includes operations performed by or at the following block(s).

At block 4401, the process performs content filtering the redirected network traffic by performing operation(s) of block(s) 4402 and 4403, described below.

At block 4402, the process performs inspecting content payloads of network packets in the redirected network traffic to detect malicious payloads. Here the process performs packet inspection or similar in order to identify malicious payloads, such as malicious code, attack vectors, buffer overflow signatures, or the like.

At block 4403, the process performs dropping network packets that include the detected malicious payloads.

Figure 4E:
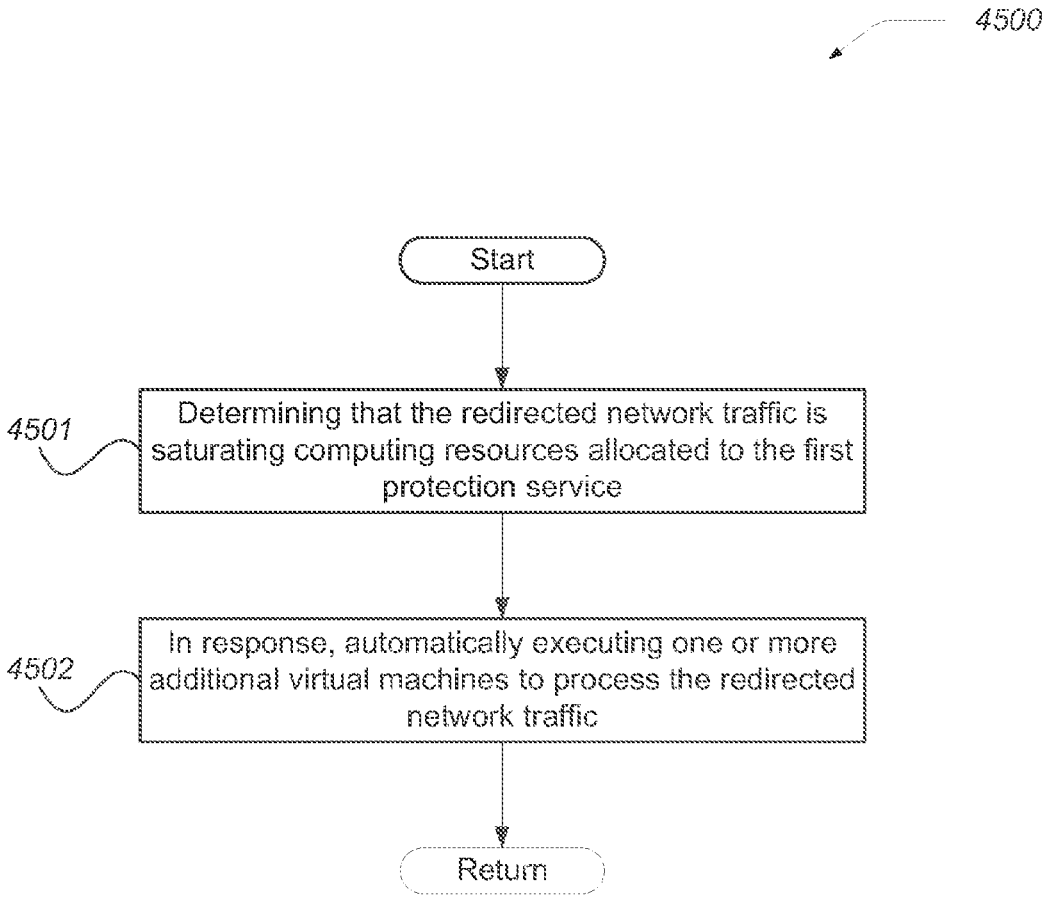

FIG. 4E is a flow diagram of example logic illustrating an embodiment of process 4100 of FIG. 4A. More particularly, FIG. 4E illustrates a process 4500 that includes the process 4100, wherein the first protection service comprises one or more virtual machines executing on hardware hosted by the first cloud service, and further comprising operations performed by or at one or more of the following block(s).

At block 4501, the process performs determining that the redirected network traffic is saturating computing resources allocated to the first protection service. As noted, each protection service is in some embodiments implemented via one or more virtual machines executing within a data center of the cloud service. The process may monitor the load (e.g., CPU utilization, I/O, network utilization) on each of the virtual machines in order to determine whether additional resources are required. In other embodiments, high load conditions may be determined based on external factors, such as response time or the like.

At block 4502, the process performs in response, automatically executing one or more additional virtual machines to process the redirected network traffic. The process self-scales in response to high load conditions. Similarly, as load drops below a threshold, one or more virtual machines may be taken out of service.

Example Computing System Implementation

Figure 5:
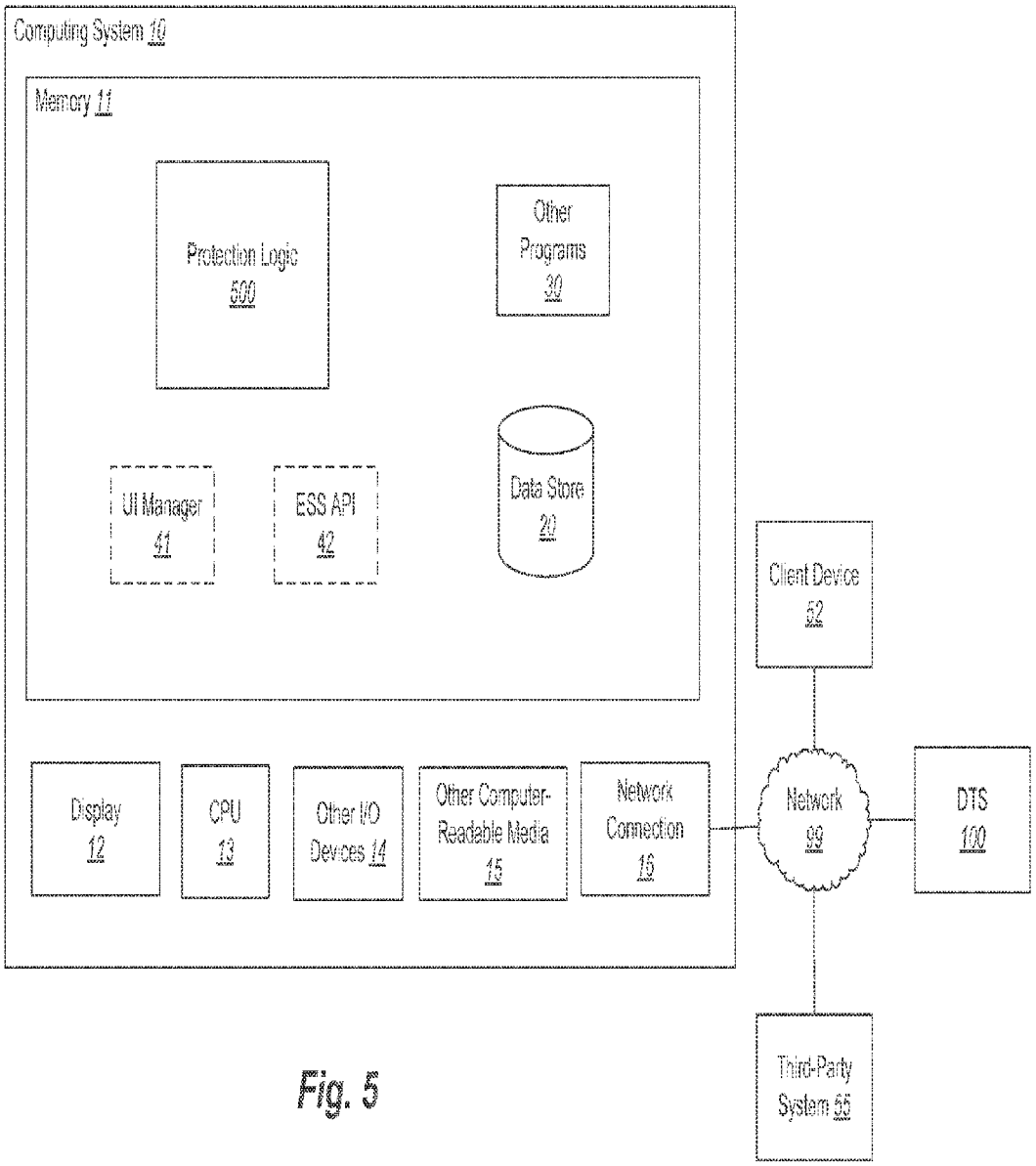
FIG. 5 is a block diagram of a computing system for implementing example embodiments.

FIG. 5 is a block diagram of a computing system for implementing example embodiments. In particular, FIG. 5 shows a computing system 10 that may be utilized to implement a protection service node 200 or a protection service manager 300.

Note that one or more general-purpose or special-purpose computing systems/devices may be used to implement the described techniques. The computing system 10 may be a physical or virtual computing system. In addition, the computing system 10 may comprise one or more distinct computing systems/devices and may span distributed locations. Furthermore, each block shown may represent one or more such blocks as appropriate to a specific embodiment or may be combined with other blocks. Also, the described techniques may be implemented in software, hardware, firmware, or in some combination to achieve the capabilities described herein.

In the embodiment shown, computing system 100 comprises a computer memory 11, a display 12, one or more Central Processing Units ("CPU") 13, input/output devices 14 (e.g., keyboard, mouse, LCD display, touch screen, and the like), other computer-readable media 15, and a network connection 16 connected to a network 99. Of note, one or more of the illustrated components may not be present in any specific implementation. For example, some embodiments may not provide other computer-readable media 15 or a display 12.

The protection service node 200 or the service manager 300 is implemented as protection logic 500 shown residing in memory 11. In other embodiments, some portion of the contents, some or all of the components of the logic 500 may be stored on and/or transmitted over the other computer-readable media 15. The logic 500 preferably executes on one or more CPUs 13 and performs the processes described herein. Other code or programs 30 (e.g., an administrative interface, a Web server, and the like) and a data store 20, also reside in the memory 11, and preferably execute on one or more CPUs 13.

The logic 500 may perform the protection-related functions described herein. For example, the logic 500 may detect network-based attacks; monitor network and system utilization and/or health; redirect network traffic; filter requests, packets, or other data associated with the attack; forward legitimate requests to the DTS 100; and the like The illustrated example logic 500 may also interact with a user interface ("UI") manager 41 and an application program interface ("API") 42. The UI manager 41 and API 42 are shown in dashed lines to indicate that in other embodiments they may be provided by other, possibly remote, computing systems. The UI manager 41 provides a view and a controller that facilitate user interaction with the logic 500 and its various components. For example, the UI manager 41 may provide interactive access to the logic 500, such that users can configure the operation of the logic, such as by specifying the identity of protection service nodes, specifying threshold levels that trigger traffic redirection, specifying information that can be used to identify malicious packets, or the like. In some embodiments, access to the functionality of the UI manager 41 may be provided via a Web server, possibly executing as one of the other programs 30. In such embodiments, a user operating a Web browser (or other client) executing on a client device 52 can interact with the logic 500 via the UI manager 41.

The API 42 provides programmatic access to one or more functions of the logic 500. For example, the API 42 may provide a programmatic interface to one or more functions of the logic 500 that may be invoked by one of the other programs 30 or some other module. In this manner, the API 42 facilitates the development of third-party software, such as user interfaces, plug-ins, monitoring feeds, adapters (e.g., for integrating functions of the logic 500 into Web applications), and the like.

The API 42 may be accessed by the third-party system 55. The third-party system 55 may be any system that interacts with the logic 500. For example, the third-party system 55 may be a network management or monitoring system executing within the data center that hosts the DTS 100. The API 42 may be used to obtain notifications that an attack has been detected, to provide other information about the current operational state of a protection node or protection manager, or the like.

The data store 20 is used by the logic 500 to store and/or communicate information. The logic 500 uses the data store 20 to record various types of information, including configuration information (e.g., identity of other systems or devices in the protection service), trigger information (e.g., network thresholds that trigger redirection), history information (e.g., monitored network load levels), and the like. The data store 20 may be used to communicate information to other protection service nodes or managers. Although the logic 500 is described as communicating through the data store 20, other communication mechanisms are contemplated, including message passing, function calls, pipes, sockets, shared memory, and the like.

The logic 500 interacts via the network 99 with client device 52, the DTS 100, and third-party systems 55. The network 99, and other networks described herein, may be any combination of one or more media (e.g., twisted pair, coaxial, fiber optic, radio frequency), hardware (e.g., routers, switches, repeaters, transceivers), and one or more protocols (e.g., TCP/IP, UDP, Ethernet, Wi-Fi, WiMAX) that facilitate communication between remotely situated humans and/or devices. In some embodiments, the network 99 may be or include multiple distinct communication channels or mechanisms (e.g., cable-based and wireless). The client device 52 may be a personal computer, laptop computer, smart phone, personal digital assistant, tablet computer, or the like. The third-party system 55 and client device 52 may be or include computing systems and/or devices constituted in a manner similar to that of computing system 100, and thus may also include displays, CPUs, other I/O devices (e.g., a camera), network connections, or the like.

In an example embodiment, components/modules of the logic 500 are implemented using standard programming techniques. For example, the logic 500 may be implemented as a "native" executable running on the CPU 13, along with one or more static or dynamic libraries. In other embodiments, the logic 500 may be implemented as instructions processed by a virtual machine that executes as one of the other programs 30. In general, a range of programming languages known in the art may be employed for implementing such example embodiments, including representative implementations of various programming language paradigms, including but not limited to, object-oriented (e.g., Java, C++, C#, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, Python, JavaScript, VBScript, and the like), and declarative (e.g., SQL, Prolog, and the like).

The data store 20 may be implemented as one or more database systems, file systems, or any other technique for storing such information, or any combination of the above, including implementations using distributed computing techniques. In addition, some embodiments may provide one or more interfaces to the data stored as part of the logic 500. Such interfaces may be provided via database connectivity APIs accessed from a variety of programming languages, Web-based interfaces, file systems interfaces, or the like.

Different configurations and locations of programs and data are contemplated for use with techniques described herein. A variety of distributed computing techniques are appropriate for implementing the components of the illustrated embodiments in a distributed manner including but not limited to TCP/IP sockets, RPC, RMI, HTTP, Web Services (XML-RPC, JAX-RPC, SOAP, and the like). Other variations are possible. Also, other functionality could be provided by each component/module, or existing functionality could be distributed amongst the components/modules in different ways, yet still achieve the functions described herein.

Furthermore, in certain embodiments, some or all of the components of the logic 500 may be implemented or provided in other manners, such as at least partially in firmware and/or hardware, including, but not limited to one or more application-specific integrated circuits ("ASICs"), standard integrated circuits, controllers executing appropriate instructions, and including microcontrollers and/or embedded controllers, field-programmable gate arrays ("FPGAs"), complex programmable logic devices ("CPLDs"), and the like. Some or all of the system components and/or data structures may also be stored as contents (e.g., as executable or other machine-readable software instructions or structured data) on a computer-readable medium (e.g., as a hard disk; a memory; a computer network or cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques. Some or all of the components and/or data structures may be stored in a non-transitory manner on tangible, non-transitory storage mediums. Some or all of the system components and data structures may also be stored as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

It should be apparent to those skilled in the art that many more modifications besides those already described are possible without departing from the inventive concepts herein. Moreover, in interpreting both the specification and the claims, all terms should be interpreted in the broadest possible manner consistent with the context. In particular, the terms "includes," "including," "comprises," and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring one or more elements from the set {A, B, C, . . . N}, and not N in addition to one or more elements from the set {A, B, C}.

All of the references cited above and in any accompanying Application Data Sheet are incorporated herein by reference in their entirety. Where a definition or use of a term in an incorporated reference is inconsistent with or contrary to the definition of that term provided herein, the definition of that term provided herein governs and the definition of that term in the reference does not apply.

While the preferred embodiment of the invention has been illustrated and described, as noted above, many changes can be made without departing from the spirit and scope of the invention. Accordingly, the scope of the invention is not limited by the disclosure of the preferred embodiment.

The embodiments of the invention in which an exclusive property or privilege is claimed are defined as follows:

The invention claimed is:

1. A computing system hosted within a data center to deliver an online service via a public network, the system comprising:

a first network interface device communicatively coupled to a first communication link connecting the computing system to the public network;

a second network interface device communicatively coupled to a second communication link connecting the computing system to a private network link, wherein the second communication link is a separate physical communication link from the first communication link;

a memory device including protection logic;

one or more central processing units communicatively coupled to the memory device, the first network interface device, and the second network interface device, the protection logic executable on the one or more central processing units to cause the computing system to perform operations including:

maintaining, via the first network interface device, the first communication link to the public network;

maintaining, via the second network interface device, the second communication link to the private network link connecting the computing system to a first cloud protection service;

receiving incoming network traffic over the first network interface device;

detecting, based on analysis of the incoming network traffic received over the first network interface device, an attack against the computing system;

in response to the detecting the attack, instructing a traffic management infrastructure to redirect the incoming network traffic from being received over the first network interface device to routing through the first cloud protection service; and subsequent to instructing the traffic management infrastructure to redirect the incoming network traffic, receiving over the second network interface device filtered network traffic from the first cloud protection service, wherein the filtered network traffic does not include a portion of the incoming network traffic associated with the attack, and further rate limits a legitimate portion of the incoming network traffic.

[2. The system of claim 1, wherein the rate limiting occurs through inspection of source addresses of network packets in the legitimate portion of the incoming network traffic redirected to the first cloud protection service, and dropping at least some network packets associated with a specified source address resulting in the filtered network traffic.]

[3. The system of claim 1, wherein the attack is a denial of service attack directed against the online service, and wherein the first cloud protection service is configured to perform rate limiting to limit the flow of packets received over the second network interface device.]

[4. The system of claim 1, wherein the first cloud protection service is configured to:

determine that the incoming network traffic redirected by the traffic management infrastructure is saturating computing resources allocated to the first cloud protection service; and in response, automatically execute one or more additional virtual machines to process the incoming network traffic.]

[5. The system of claim 1, further comprising:

a third network interface device coupled to a second private network link;

wherein instructing the traffic management infrastructure includes requesting that the traffic management infrastructure redirect the incoming network traffic by distributing a first portion of the incoming network traffic to the first cloud protection service and a second portion of the incoming network traffic to a second cloud protection service; and subsequent to instructing the traffic management infrastructure, receiving a second filtered network traffic over the third network interface device from the second cloud protection service.]

[6. The system of claim 1, wherein the first cloud protection service is configured to automatically filter the network traffic associated with the attack.]

[7. A method for protecting an online service, the method comprising:

protecting the online service from an attack, the online service provided by a computing system hosted in a data center and a first cloud protection service hosted by a first cloud service that is distinct from the data center, wherein the computing system is communicatively coupled to a public network via a first network interface device coupled to a first communication link, including a traffic management infrastructure, and communicatively coupled to the first cloud protection service via a first private link through a second network interface device, wherein the first communication link is a separate physical communication link from the first private link, the protecting including:

maintaining, via the first network interface device, the first communication link to the public network;

maintaining, via the second network interface device, a second communication link to the private network link connecting the computing system to a first cloud protection service;

detecting, on the computing system based on analysis of incoming network traffic received over the public network, an attack against the computing system;

in response to the detecting the attack, instructing a traffic management infrastructure to redirect the incoming network traffic to the first cloud protection service; and subsequent instructing the traffic management infrastructure to redirect the incoming network traffic, receiving over the first private link via the second network interface device filtered network traffic from the first cloud protection service, wherein the filtered network traffic does not include a malicious portion of the incoming network traffic associated with the attack, and further rate limits a legitimate portion of the incoming network traffic, wherein the malicious portion of the incoming network traffic is at least a portion of the attack.]

[8. The method of claim 7, wherein the rate limiting occurs through inspection of source addresses of network packets in the legitimate portion of the incoming network traffic redirected to the first cloud protection service, and dropping at least some network packets associated with a specified source address resulting in the filtered network traffic.]

[9. The method of claim 7, wherein the online service further includes a second cloud protection service hosted by a second cloud service that is distinct from the data center and the first cloud service, the second protection service communicatively coupled to the computing system via a second private link through a third network interface device;

wherein the instructing the traffic management infrastructure, includes distributing incoming network traffic by requesting the traffic management infrastructure to redirect incoming network traffic by distributing a first portion of the incoming network traffic to the first cloud protection service and a second portion of the incoming network traffic to the second cloud protection service; and in response to redirecting network traffic, receiving at the computing system hosted in the data center, via the first private link coupled to the second network interface device and via the second private link coupled to the third network interface device, only network traffic associated with the legitimate requests to the computing system forwarded by the first cloud protection service and the second cloud protection service after dropping network traffic associated with the attack.]

[10. The method of claim 7, wherein the first cloud protection service comprises one or more virtual machines executing on hardware hosted by the first cloud service, and further comprising:

determining that the redirected incoming network traffic is saturating computing resources allocated to the first cloud protection service; and in response, automatically executing one or more additional virtual machines to process the redirected incoming network traffic.]

[11. The method of claim 7, wherein the detecting the attack includes: detecting a volumetric denial of service attack that is attempting to saturate a link between the public network and the computing system.]

[12. The method of claim 7, wherein the detecting the attack includes: detecting an application-level denial of service attack that is attempting to saturate computing resources of the computing system.]

[13. The method of claim 7, wherein the instructing the traffic management infrastructure to redirect incoming network traffic includes transmitting instructions configuring a domain name service to remap a hostname associated with the online service from a network address associated with the computing system to a network address associated with the first cloud protection service.]

[14. The method of claim 7, wherein the instructing the traffic management infrastructure to redirect incoming network traffic includes transmitting instructions configuring, via the Border Gateway Protocol, a routing table to route the network traffic to the first protection service.]

[15. The method of claim 7, wherein the dropping network traffic associated with the attack includes: configuring a firewall of the first cloud protection service to drop network packets associated with the network traffic associated with the attack.]

[16. A non-transitory computer-readable storage medium including instructions that, when executed on devices delivering an online service, cause the devices to perform operations including:

protecting the online service from an attack, the online service provided by devices including a computing system hosted in a data center and a first cloud protection service hosted by a first cloud service that is distinct from the data center, wherein the computing system is communicatively coupled to a public network via a first network interface device coupled to a first communication link, including a traffic management infrastructure, and communicatively coupled to the first cloud protection service via a first private link through a second network interface device, wherein the first communication link is a separate physical communication link from the first private link, the protecting including:

maintaining, via the first network interface device, the first communication link to the public network;

maintaining, via the second network interface device, a second communication link to the private network link connecting the computing system to a first cloud protection service;

detecting, on the computing system based on analysis of incoming network traffic received over the public network, an attack against the computing system;

in response to the detecting the attack, instructing a traffic management infrastructure to redirect the incoming network traffic to the first cloud protection service; and subsequent instructing the traffic management infrastructure to redirect the incoming network traffic, receiving over the first private link via the second network interface device filtered network traffic from the first cloud protection service, wherein the filtered network traffic does not include a malicious portion of the incoming network traffic associated with the attack, and further rate limits a legitimate portion of the incoming network traffic, wherein the malicious portion of the incoming network traffic is at least a portion of the attack.]

[17. The non-transitory computer-readable storage medium of claim 16, wherein the rate limiting occurs through inspection of source addresses of network packets in the legitimate portion of the incoming network traffic redirected to the first cloud protection service, and dropping at least some network packets associated with a specified source address resulting in the filtered network traffic.]

[18. The non-transitory computer-readable storage medium of claim 16, wherein the online service further includes a second cloud protection service hosted by a second cloud service that is distinct from the data center and the first cloud service, the second protection service communicatively coupled to the computing system via a second private link through a third network interface device;

wherein the instructions for instructing the traffic management infrastructure further include instructions for distributing incoming network traffic by requesting the traffic management infrastructure to redirect incoming network traffic by distributing a first portion of the incoming network traffic to the first cloud protection service and a second portion of the incoming network traffic to the second cloud protection service; and in response to redirecting network traffic, receiving at the computing system hosted in the data center, via the first private link coupled to the second network interface device and via the second private link coupled to the third network interface device, only network traffic associated with the legitimate requests to the computing system forwarded by the first cloud protection service and the second cloud protection service after dropping network traffic associated with the attack.]

[19. The non-transitory computer-readable storage medium of claim 16, wherein the first cloud protection service comprises one or more virtual machines executing on hardware hosted by the first cloud service, and further comprising instructions for:

determining that the redirected incoming network traffic is saturating computing resources allocated to the first cloud protection service; and in response, automatically executing one or more additional virtual machines to process the redirected incoming network traffic.]

[20. The non-transitory computer-readable storage medium of claim 16, wherein the detecting the attack includes at least one of:

detecting a volumetric denial of service attack that is attempting to saturate a link between the public network and the computing system; and detecting the attack includes: detecting an application-level denial of service attack that is attempting to saturate computing resources of the computing system.]

*21. A method comprising:*

*establishing, via a first network interface device, a first communication link between a computing system providing an online service and a public network;*

*establishing, via a second network interface device, a second communication link between the computing system and a first cloud protection service;*

*detecting, on the computing system based on analysis of incoming network traffic received over the public network, an attack against the computing system;*

*in response to the detecting the attack, instructing a traffic management infrastructure of the public network to redirect the incoming network traffic to the first cloud protection service; and*

*receiving, over the second communication link via the second network interface device, filtered network traffic from the first cloud protection service, wherein the filtered network traffic does not include a malicious portion of the incoming network traffic associated with the attack, and wherein a legitimate portion of the incoming network traffic is rate limited.*

*22. The method of claim 2, wherein incoming network traffic is rate limited by inspecting source addresses of network packets in the legitimate portion of the incoming network traffic redirected to the first cloud protection service, and dropping at least some network packets associated with a specified source address resulting in the filtered network traffic.*

*23. The method of claim 2, wherein the online service further includes a second cloud protection service hosted by a second cloud service that is distinct from the first cloud service, the second protection service communicatively coupled to the computing system via a second private link through a third network interface device;*

*wherein the instructing the traffic management infrastructure comprises distributing a first portion of the incoming network traffic to the first cloud protection service and a second portion of the incoming network traffic to the second cloud protection service; and*

*in response to redirecting network traffic, receiving at the computing system, via the first private link coupled to the second network interface device and via the second private link coupled to the third network interface device, only network traffic associated with the legitimate requests to the computing system forwarded by the first cloud protection service and the second cloud protection service after dropping network traffic associated with the attack.*

*24. The method of claim 2, wherein the first cloud protection service comprises one or more virtual machines executing on hardware hosted by the first cloud service, and further comprising:*

*determining that the redirected incoming network traffic is saturating computing resources allocated to the first cloud protection service; and*

*in response, automatically executing one or more additional virtual machines to process the redirected incoming network traffic.*

*25. The method of claim 2, wherein detecting the attack includes detecting a volumetric denial of service attack that is attempting to saturate a link between the public network and the computing system.*

*26. The method of claim 2, wherein detecting the attack includes detecting an application-level denial of service attack that is attempting to saturate computing resources of the computing system.*

*27. The method of claim 2, wherein instructing the traffic management infrastructure to redirect incoming network traffic includes configuring a domain name service to remap a hostname associated with the online service from a network address associated with the computing system to a network address associated with the first cloud protection service.*

*28. The method of claim 2, wherein instructing the traffic management infrastructure to redirect incoming network traffic includes configuring, via Border Gateway Protocol, a routing table to route the network traffic to the first protection service.*

*29. The method of claim 2, wherein dropping network traffic associated with the attack includes configuring a firewall of the first cloud protection service to drop network packets associated with the network traffic associated with the attack.*

*30. A non-transitory computer-readable storage medium storing executable instructions that, when executed by a computing system, cause the computing system to perform steps comprising:*

*establishing, via a first network interface device, a first communication link between a computing system providing an online service and a public network;*

*establishing, via a second network interface device, a second communication link between the computing system and a first cloud protection service;*

*detecting, on the computing system based on analysis of incoming network traffic received over the public network, an attack against the computing system;*

*in response to the detecting the attack, instructing a traffic management infrastructure of the public network to redirect the incoming network traffic to the first cloud protection service; and*

*receiving, over the second communication link via the second network interface device, filtered network traffic from the first cloud protection service, wherein the filtered network traffic does not include a malicious portion of the incoming network traffic associated with the attack, and wherein a legitimate portion of the incoming network traffic is rate limited.*

*31. The non-transitory computer-readable storage medium of claim 11, wherein incoming network traffic is rate limited by inspecting source addresses of network packets in the legitimate portion of the incoming network traffic redirected to the first cloud protection service, and dropping at least some network packets associated with a specified source address resulting in the filtered network traffic.*

*32. The non-transitory computer-readable storage medium of claim 11, wherein the online service further includes a second cloud protection service hosted by a second cloud service that is distinct from the first cloud service, the second protection service communicatively coupled to the computing system via a second private link through a third network interface device;*

*wherein the instructing the traffic management infrastructure comprises distributing a first portion of the incoming network traffic to the first cloud protection service and a second portion of the incoming network traffic to the second cloud protection service; and*

*in response to redirecting network traffic, receiving at the computing system, via the first private link coupled to the second network interface device and via the second private link coupled to the third network interface device, only network traffic associated with the legitimate requests to the computing system forwarded by the first cloud protection service and the second cloud protection service after dropping network traffic associated with the attack.*

*33. The non-transitory computer-readable storage medium of claim 11, wherein the first cloud protection service comprises one or more virtual machines executing on hardware hosted by the first cloud service, and wherein the instructions, when executed, cause the computing system to perform further steps comprising:*

*determining that the redirected incoming network traffic is saturating computing resources allocated to the first cloud protection service; and*

*in response, automatically executing one or more additional virtual machines to process the redirected incoming network traffic.*

*34. The non-transitory computer-readable storage medium of claim 11, wherein detecting the attack includes detecting a volumetric denial of service attack that is attempting to saturate a link between the public network and the computing system.*

*35. The non-transitory computer-readable storage medium of claim 11, wherein detecting the attack includes detecting an application-level denial of service attack that is attempting to saturate computing resources of the computing system.*

*36. The non-transitory computer-readable storage medium of claim 11, wherein instructing the traffic management infrastructure to redirect incoming network traffic includes configuring a domain name service to remap a hostname associated with the online service from a network address associated with the computing system to a network address associated with the first cloud protection service.*

*37. The non-transitory computer-readable storage medium of claim 11, wherein instructing the traffic management infrastructure to redirect incoming network traffic includes configuring, via Border Gateway Protocol, a routing table to route the network traffic to the first protection service.*

*38. The non-transitory computer-readable storage medium of claim 11, wherein dropping network traffic associated with the attack includes configuring a firewall of the first cloud protection service to drop network packets associated with the network traffic associated with the attack.*

* * * * *